United States Patent
Lee et al.

(10) Patent No.: US 10,556,277 B2
(45) Date of Patent: Feb. 11, 2020

(54) DOUBLE-SIDED CUTTING INSERT HAVING HIGH FEED RATE AND CUTTING TOOL EQUIPPED THEREWITH

(71) Applicant: KORLOY INC., Seoul (KR)

(72) Inventors: Sang Yong Lee, Cheongju-si (KR); Young Nam Choi, Cheongju-si (KR); Jae Yeong Mun, Cheongju-si (KR); Sun Yong Ahn, Cheongju-si (KR)

(73) Assignee: KORLOY INC., Seoul (KR)

( * ) Notice: Subject to any disclaimer, the term of this patent is extended or adjusted under 35 U.S.C. 154(b) by 0 days.

(21) Appl. No.: 15/773,165

(22) PCT Filed: Aug. 30, 2016

(86) PCT No.: PCT/KR2016/009616
§ 371 (c)(1),
(2) Date: May 2, 2018

(87) PCT Pub. No.: WO2017/078261
PCT Pub. Date: May 11, 2017

(65) Prior Publication Data
US 2018/0333791 A1    Nov. 22, 2018

(30) Foreign Application Priority Data
Nov. 4, 2015 (KR) .......................... 10-2015-0154505

(51) Int. Cl.
*B23B 27/16* (2006.01)
*B23C 5/02* (2006.01)
*B23C 5/20* (2006.01)

(52) U.S. Cl.
CPC .............. *B23C 5/20* (2013.01); *B23C 5/207* (2013.01); *B23B 27/16* (2013.01); *B23C 2200/0455* (2013.01); *B23C 2200/0494* (2013.01); *B23C 2200/203* (2013.01); *B23C 2200/367* (2013.01)

(58) Field of Classification Search
CPC .......... Y10T 408/5586; Y10T 408/909; Y10T 408/9093; Y10T 407/1908; Y10T 407/191;
(Continued)

(56) References Cited

U.S. PATENT DOCUMENTS 4,124,326 A * 11/1978 Cost ...................... B23B 27/141
                                                          407/114
5,333,972 A *  8/1994 Bernadic ............... B23B 27/141
                                                          407/113
(Continued)

FOREIGN PATENT DOCUMENTS

AU          645885 B2     1/1994
CA       2779195 A1  *  5/2011 ........... B23B 27/141
(Continued)

*Primary Examiner* — Nicole N Ramos
(74) *Attorney, Agent, or Firm* — Rabin & Berdo, P.C.

(57) ABSTRACT

The technical objective of the present invention is to provide a double-sided cutting insert having a high feed rate, which can increase the edge strength and reduce the cutting load, and thus can be suitable for high feed rate processing. To this end, a double-sided cutting insert having a high feed rate according to the present invention comprises: two main surfaces that face in opposite directions; two shorter side surfaces, which connect between the two main surfaces, and which face in opposite directions; two longer side surfaces, which connect between the two main surfaces and between the two shorter side surfaces, which face in opposite directions, and the width of which is larger than that of the shorter side surfaces; and a fastening hole that extends through the two longer side surfaces such that a cutting tool fastening bolt is inserted therein, wherein the double-sided cutting insert having a high feed rate comprises a shorter cutting edge provided on a boundary portion between each of the main surfaces and each of the shorter side surfaces, a longer cutting edge provided on a boundary portion between each of the main surfaces and each of the longer side surfaces, and a corner cutting edge that connects between the shorter cutting edge and the longer cutting edge, and the shorter cutting edge has a curved shape that is outwardly convex, when the same is viewed from a direction of the main surfaces.

18 Claims, 8 Drawing Sheets

(58) Field of Classification Search
CPC .......... Y10T 407/192; Y10T 407/1924; Y10T 407/1932; Y10T 407/1934; Y10T 407/1936; Y10T 407/1942; Y10T 407/227; Y10T 407/23; B23C 2200/0433; B23C 2200/361; B23C 2200/367; B23C 2200/41; B23C 2200/086; B23C 2200/164; B23C 2200/205; B23C 2200/208; B23C 2010/168; B23C 2210/086; B23C 5/06; B23C 5/22211; B23C 5/04; B23C 5/2213
See application file for complete search history.

(56) References Cited

U.S. PATENT DOCUMENTS

| | | | | |
|---|---|---|---|---|
| 6,227,772 B1 * | 5/2001 | Heinloth | ................ | B23C 5/202 407/113 |
| 7,008,146 B2 * | 3/2006 | DeRoche | ................ | B23C 5/109 407/114 |
| 7,104,735 B2 * | 9/2006 | Johnson | ................ | B23C 5/06 407/113 |
| 8,202,026 B2 * | 6/2012 | Satran | ................ | B23C 5/207 407/113 |
| 9,044,813 B2 * | 6/2015 | Choi | ................ | B23C 5/08 |
| 2005/0063792 A1 * | 3/2005 | Satran | ................ | B23C 5/1072 407/113 |

FOREIGN PATENT DOCUMENTS

| | | | |
|---|---|---|---|
| CN | 101878083 A | 11/2010 | |
| EP | 01711296 A1 | 10/2006 | |
| EP | 1782902 A2 * | 5/2007 | ............... B23C 5/06 |
| EP | 02214857 A1 | 8/2010 | |
| KR | 10-1996-0000555 B1 | 1/1996 | |
| KR | 1020050115643 A | 12/2005 | |
| KR | 10-0657382 B1 | 12/2006 | |

* cited by examiner

Prior Art

DOUBLE-SIDED CUTTING INSERT HAVING HIGH FEED RATE AND CUTTING TOOL EQUIPPED THEREWITH

BACKGROUND

Technical Field

The present disclosure relates to a double-sided cutting insert having a high feed rate and a cutting tool equipped therewith.

Background Art

Generally, a cutting insert is fastened to a cutting tool mounted on a machine tool and is used for cutting a workpiece made of iron, non-ferrous metal, non-metal material, and so on.

FIG. 7 is a perspective view of a conventional tangential cutting insert, and FIG. 8 is a perspective view of another conventional double-sided cutting insert.

An example of the conventional tangential cutting insert 10 is disclosed in EP02214857 A1, which includes, as shown in FIG. 7, an upper surface 12, a lower surface 14, two side surfaces 24 that connect between the upper surface and the lower surface, a front surface 20 that connects between the two side surfaces, a main cutting edge 32 formed between the front surface 20 and the upper surface 12, a sub cutting edge 34 formed between the front surface 20 and the side surface 24, a fastening hole 18 into which a cutting tool fastening bolt (not shown) extending through the upper surface 12 and the lower surface 14 is inserted. In this example, when viewed from the direction of the upper surface 12, the main cutting edge 32 has a substantially "V" shape in which two inclined straight lines are connected in the middle, and when viewed from the direction of the side surface 24, the sub cutting edge 34 has a straight line shape. A corner cutting edge 36 is placed between the main cutting edge 32 and the sub cutting edge 34.

Another example of the conventional double-sided cutting insert 10 is disclosed in EP01711296 A1, which includes, as shown in FIG. 8, two shorter side surfaces 12 that face each other in opposite directions, two main side surfaces 18 and two sub side surfaces 16 that connect between the two end surfaces, four main cutting edges 34 that connects each of the end surfaces 12 and each of the main side surfaces 18, four sub cutting edge 36 that connects each of the end surfaces 12 and each of the sub side surfaces 16, a fastening hole 22 into which a cutting tool fastening bolt (not shown) extending through the two main side surfaces is inserted. In this example, the main cutting edge 34 has a shape of a straight line inclined to one side when viewed from the direction of the main side surface 18, and the sub cutting edge 36 has a shape of a straight line inclined to one side when viewed from the direction of the sub side surface 16, and a corner cutting edge 40 is placed between the main cutting edge 34 and the sub cutting edge 36.

However, the conventional technologies like those described above have a drawback that since the main cutting edge and the sub cutting edge have a straight line shape, the edge strength is decreased, and they cannot be used for high feed rate cutting due to considerable contact load with the workpiece.

DETAILED DESCRIPTION

Technical Problem

The technical objective of the present disclosure is to provide a double-sided cutting insert having a high feed rate and a cutting tool equipped with the same, capable of increasing the edge strength and also reducing the cutting load such that the same is suitable for high feed rate cutting.

Technical Solution

According to an aspect of the present disclosure, there is provided a double-sided cutting insert having a high feed rate, which may include: two main surfaces that face in opposite directions, two shorter side surfaces which connect between the two main surfaces and which face in opposite directions, two longer side surfaces, which connect between the two main surfaces and between the two shorter side surfaces, which face in opposite directions, and the width of which is larger than that of the shorter side surfaces, and a fastening hole that extends through the two longer side surfaces such that a cutting tool fastening bolt is inserted therein, wherein the double-sided cutting insert having a high feed rate may include a shorter cutting edge provided on a boundary portion between each of the main surfaces and each of the shorter side surfaces, a longer cutting edge provided on a boundary portion between each of the main surface and each of the longer side surfaces, and a corner cutting edge that connects between the shorter cutting edge and the longer cutting edge, and the shorter cutting edge has a curved shape that is outwardly convex, when the same is viewed from a direction of the main surfaces.

The shorter cutting edge may have a curved shape that is outwardly convex, when viewed from the direction of the shorter side surface.

The longer cutting edge may include first and second concave sections that are inwardly recessed when viewed from the direction of the longer side surface, and a straight line section that connects the first and second concave sections.

When viewed from the direction of the longer side surface, each of the first and second concave sections may start from the corner cutting edge and end in the straight line section.

When viewed from the direction of the longer side surface, the corner cutting edge may be connected to the shorter cutting edge in a concave shape, continuously from the first and second concave sections.

The corner cutting edge may be curved with the same radius of curvature as the first and second concave sections.

The longer cutting edge may have a symmetrical shape with respect to a center of the straight line section.

The straight line section may protrude outwardly relative to the first and second concave sections.

The shorter side surface may include first and second edge clearance surfaces adjacent to each of the major surfaces, and a center clearance surface that connects the first and second edge clearance surfaces. Each of the first and second edge clearance surfaces may form the obtuse angle with respect to the major surface.

The center clearance surface may form the right angles with respect to the main surface and may have a generally planar shape.

Each of the first and second edge clearance surfaces may have a shape gradually increasing in width from the center toward each of the longer side surfaces.

Each of the main surfaces may be horizontally symmetrical, vertically symmetrical, and rotationally symmetrical by 180 degrees with respect to the center thereof, each of the shorter side surfaces may be horizontally symmetrical, vertically symmetrical, and rotationally symmetrical by 180 degrees with respect to the center thereof, and each of the longer side surfaces may be horizontally symmetrical, vertically symmetrical, and rotationally symmetrical by 180 degrees with respect to the center thereof.

When viewed from the direction of the main surface, the center of the shorter cutting edge may protrude more than the other portion.

When viewed from the direction of the shorter side surface, the center of the shorter cutting edge may protrude more than the other portion.

Meanwhile, a cutting tool according to an embodiment of the present disclosure is a type of cutting tool that is equipped with a double-sided cutting insert having a high feed rate according to the embodiment of the present disclosure described above, which may include a first seat surface on which the main surface is placed, a second seat surface on which the shorter side surface is placed, a third seat surface on which the longer side surface is placed, and the third seat surface may be inclined in a direction away from the center of the cutting tool toward the bottom surface of the cutting tool.

Advantageous Effects

As described above, the double-sided cutting insert having a high feed rate and the cutting tool equipped with the same according to an embodiment of the present disclosure have the following effects.

According to an embodiment of the present disclosure, a technical configuration is provided, which includes a shorter cutting edge, a longer cutting edge, and a corner cutting edge, in which the shorter cutting edge has a curved shape that is outwardly convex, when viewed from the direction of the main surface. Since this curved shape can increase the edge strength of the shorter cutting edge and reduce the contact resistance with the workpiece and accordingly reduce the contact load, the technical configuration can be optimized for high feed rate cutting.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

BEST MODE

Hereinafter, preferred embodiments of the present disclosure will be described in detail with reference to the accompanying drawings, that will be readily apparent to those skilled in the art to which the present disclosure pertains. However, the description proposed herein is just a preferable example for the purpose of illustrations only, not intended to limit the scope of the disclosure, so it should be understood that other equivalents and modifications could be made thereto without departing from the scope of the disclosure.

Figure 1:
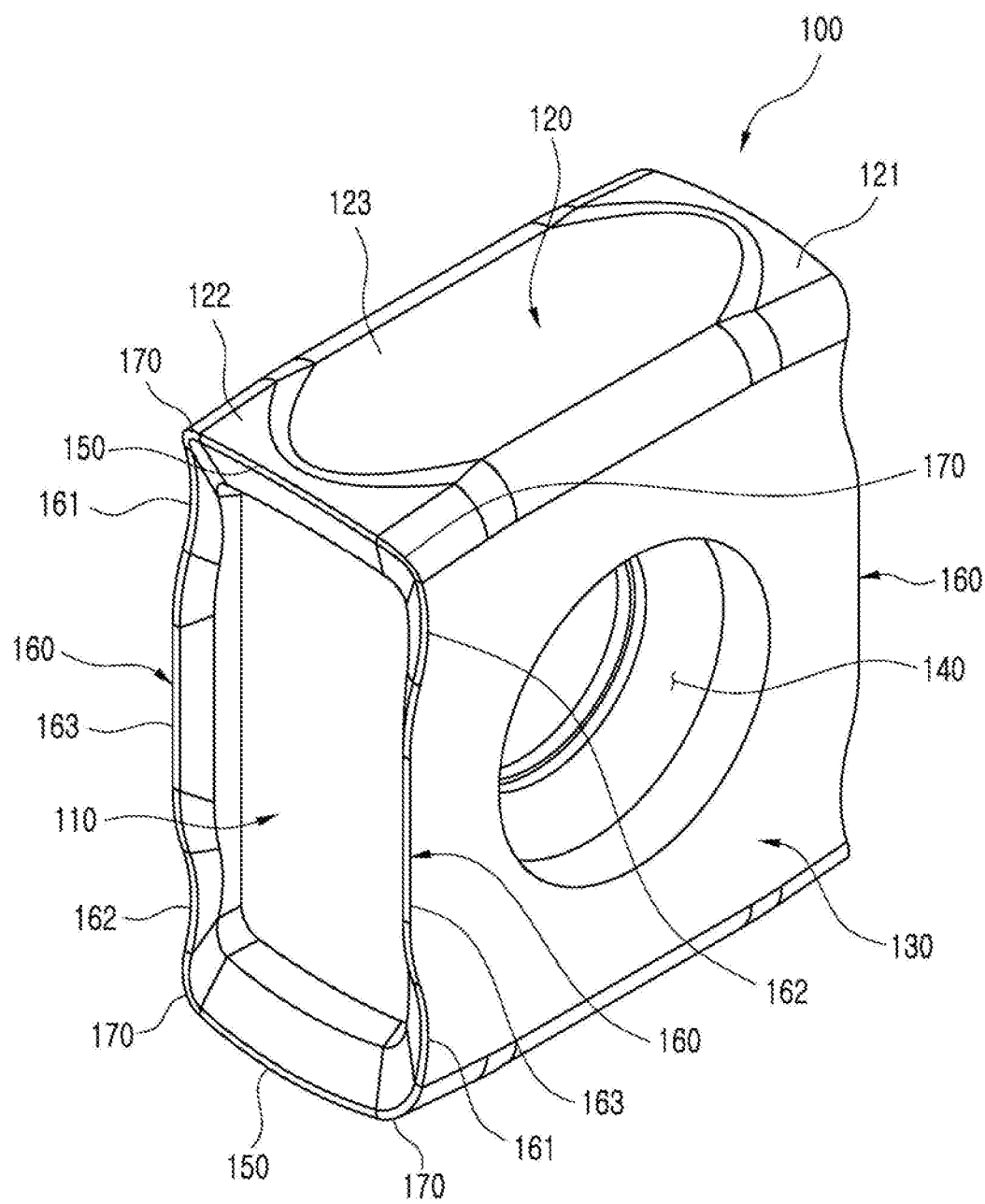
FIG. 1 is a perspective view schematically showing a double-sided cutting insert having a high feed rate according to an embodiment of the present disclosure.
Figure 2:
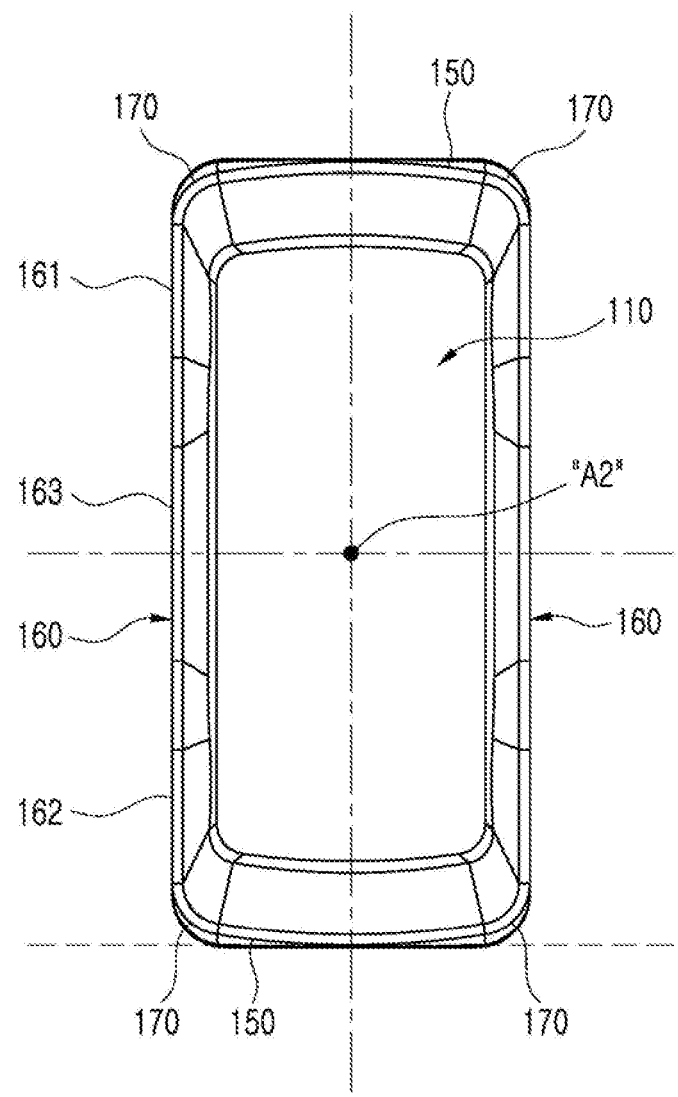
FIG. 2 is a view of the double-sided cutting insert having a high feed rate of FIG. 1 viewed from the direction of the main surface.

FIG. 1 is a perspective view schematically showing a double-sided cutting insert having a high feed rate according to an embodiment of the present disclosure, and FIG. 2 is a view of the double-sided cutting insert having a high feed rate of FIG. 1 viewed from the direction of the main surface.

Figure 3:
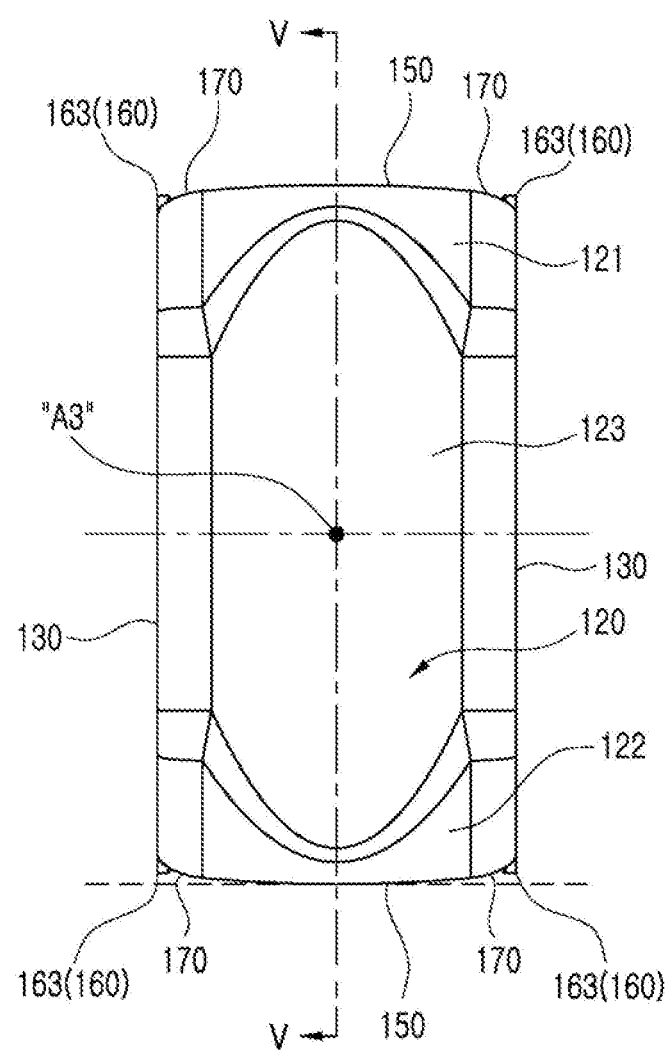
FIG. 3 is a view of the double-sided cutting insert having a high feed rate of FIG. 1 viewed from the direction of the shorter side surface.
Figure 4:
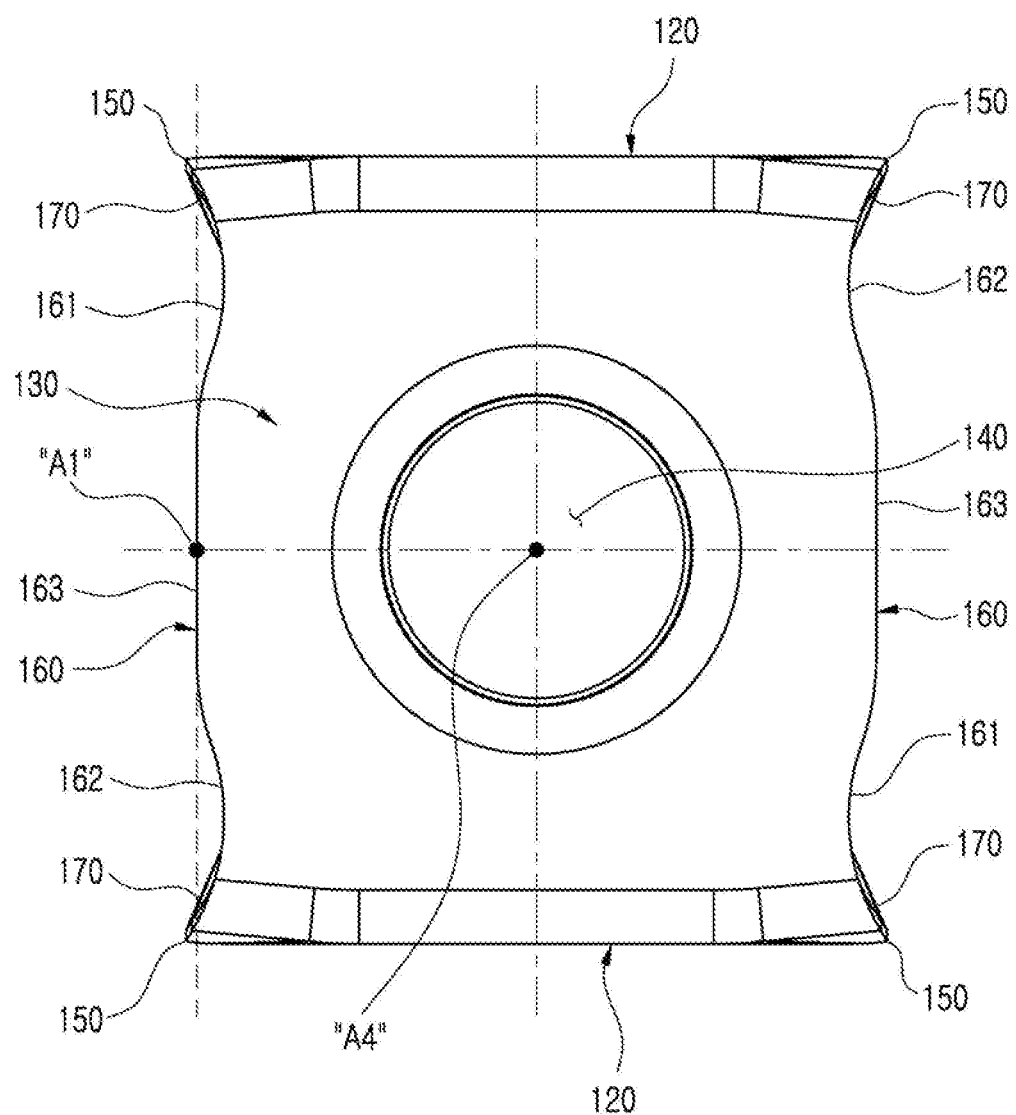
FIG. 4 is a view of the double-sided cutting insert having a high feed rate of FIG. 1 viewed from the direction of the longer side surface.
Figure 5:
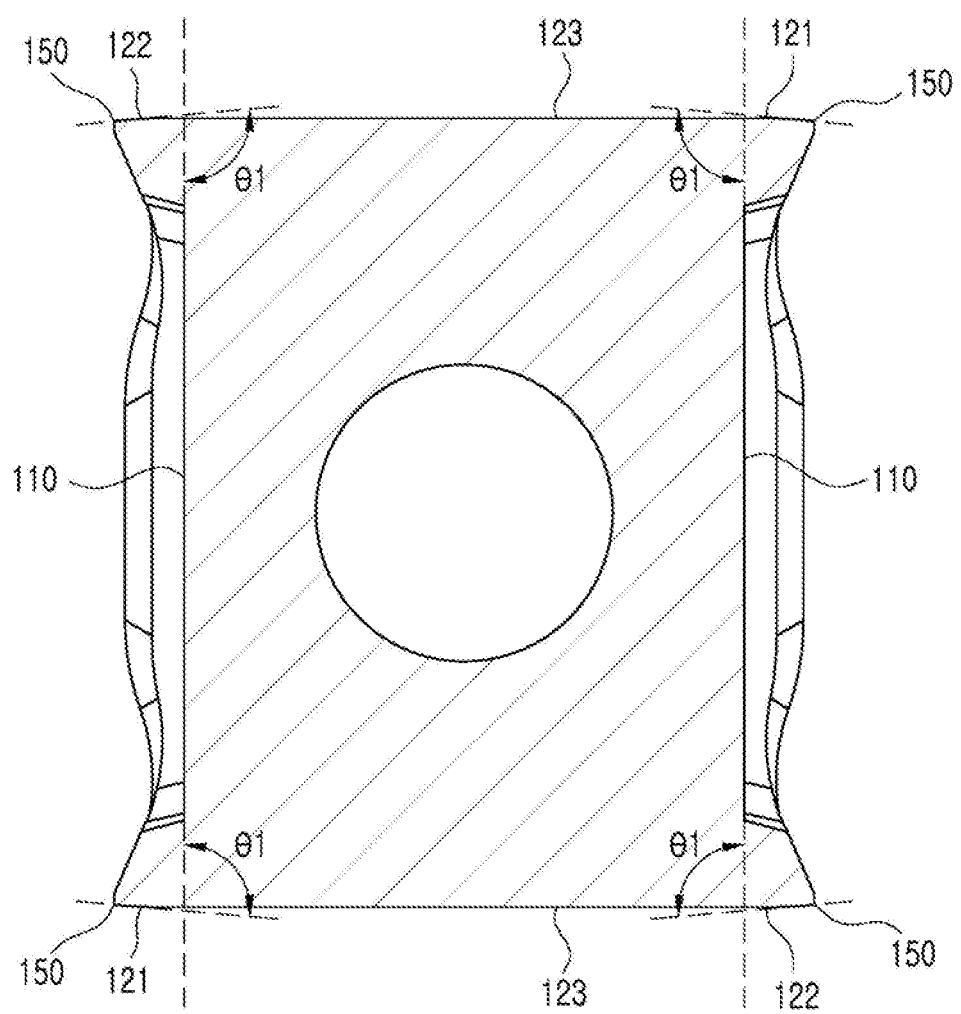
FIG. 5 is a view of the double-sided cutting insert having a high feed rate of FIG. 3 cut along the V-V line.

FIG. 3 is a view of the double-sided cutting insert having a high feed rate of FIG. 1 viewed from the direction of the shorter side surface, FIG. 4 is a view of the double-sided cutting insert having a high feed rate of FIG. 1 viewed from the direction of the longer side surface, and FIG. 5 is a view of the double-sided cutting insert having a high feed rate of FIG. 3 cut along the V-V line.

As shown in FIGS. 1 to 5, a double-sided cutting insert 100 having a high feed rate according to an embodiment of the present disclosure includes two main surfaces (upper and lower surfaces) 110, two shorter side surfaces 120, two longer side surfaces (sub side surfaces) 130, a fastening hole 140, a shorter cutting edge (main cutting edge) 150, a longer cutting edge (outer main cutting edge) 160, and a corner cutting edge 170. Hereinafter, each of the components will be described in detail with continued reference to FIGS. 1 to 5.

As shown in FIGS. 1 to 4, the two major surfaces 110 face in opposite directions, the two shorter side surfaces 120 connect between the two major surfaces 110 and face in opposite directions, and the two longer side surfaces 130 connect between the two major surfaces 110 and between the two shorter side surfaces 120, face in opposite directions, and have a width greater than the shorter side surface 120. In addition, as shown in FIGS. 1 and 4, the fastening hole 140 extends through the two longer side surfaces 130 such that the cutting tool fastening bolt 10 (see FIG. 6) is inserted therein.

Further, each of the main surfaces 110 may be horizontally symmetrical, vertically symmetrical, and rotationally symmetrical by 180 degrees with respect to the center A2 thereof, as shown in FIG. 2. Further, each of the shorter side surfaces 120 may be horizontally symmetrical, vertically symmetrical, and rotationally symmetrical by 180 degrees with respect to the center A3 thereof, as shown in FIG. 3. Each of the longer side surfaces 130 may also be horizontally symmetrical, vertically symmetrical, and rotationally symmetrical by 180 degrees with respect to the center A4 thereof, as shown in FIG. 4. Therefore, the cutting insert may be applied not only to a right-handed type cutting tool 200 (see FIG. 6) that performs cutting while being rotated to the right, but also to a left-handed type cutting tool (not shown) that performs cutting while being rotated to the left, and with the double-sided cutting insert 100 having a high feed rate according to the present disclosure, it is possible to use any type of cutting tool using eight corners alternately.

As shown in FIGS. 1 to 4, a shorter cutting edge (main cutting edge) 150 is provided on a boundary portion between each of the main surfaces 110 and each of the shorter side surfaces 120 to substantially cut the workpiece in contact therewith, the longer cutting edge 160 is provided on a boundary portion between each of the main surfaces 110 and each of the longer side surfaces 130 to substantially cut the workpiece in contact therewith, and the corner cutting edge 170 connects between each of the shorter cutting edges 150 and each of the longer cutting edges 160 to substantially cut the workpiece in contact therewith. The double-sided cutting insert 100 having a high feed rate according to an embodiment of the present disclosure described above includes four shorter cutting edges 150, four longer cutting edges 160, and eight corner cutting edges 170.

Hereinafter, referring to FIGS. 1 to 4 again, the shorter cutting edge 150 will be described in more detail.

The shorter cutting edge 150 has a curved shape that is outwardly convex, when viewed from the direction of the main surface 110, as shown in FIG. 2. Therefore, a convex curved shape can allow increased edge strength of the shorter cutting edge 150, while it also reduces the contact resistance with the workpiece and thus reduces the cutting load, and accordingly, the double-sided cutting insert 100 having a high feed rate according to the present disclosure, which has the shorter cutting edge in the shape described above, can be ultimately used for high feed rate cutting. In addition, as shown in FIG. 2, when viewed from the direction of the main surface 110, the center of the shorter cutting edge 150 may protrude more than the other portion, and has a horizontally symmetrical structure about the protruding portion such that the cutting insert can be used for both the left-handed type cutting tool (not shown) and the right-handed type cutting tool 200 (see FIG. 6).

In addition, the shorter cutting edge 150 may have curved shape that is outwardly convex, even when viewed from the direction of the shorter side surface 120, as shown in FIG. 3. Thus, the shorter cutting edges 150 form an obtuse angle with respect to the longer cutting edge 160 when viewed from the direction of the main surface 110 as shown in FIG. 2, and form an obtuse angle with respect to the longer side surface 130 when viewed from the direction of the shorter side surface 120 as shown in FIG. 3, such that the shorter cutting edge 150 have a substantially helix cutting edge structure, and this can further increase the edge strength of the shorter cutting edge 150 and further reduce the cutting load of the shorter cutting edge 150.

Figure 6:
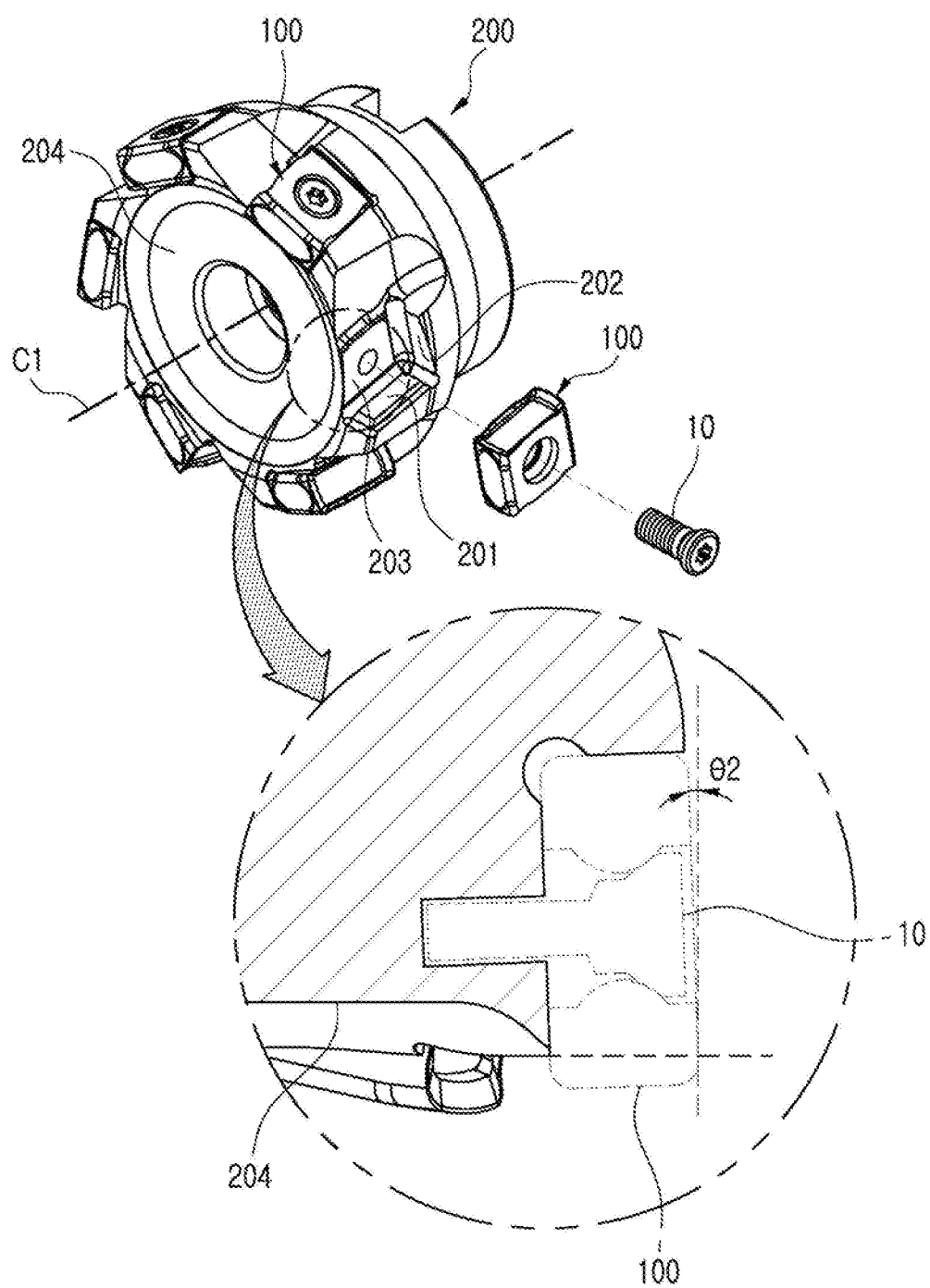
FIG. 6 is a perspective view schematically showing a cutting tool equipped with the double-sided cutting insert having a high feed rate of FIG. 1.

Further, as shown in FIG. 3, even when viewed from the direction of the shorter side surface 120, the center of the shorter cutting edge 150 may protrude more than the other portion, and the shorter cutting edge 150 may have a horizontally symmetrical structure about the protruding portion such that the cutting insert can be used for both left-handed type cutting tool (not shown) and right-handed type cutting tool 200 (see FIG. 6).

Hereinafter, referring to FIGS. 1 to 4 again, the longer cutting edge 160 will be described in more detail.

As shown in FIGS. 1 and 4, the longer cutting edge 160 may include a first concave section (a first outer main cutting edge) 161 and a second concave section (a third outer main cutting edge) 162, which are inwardly concaved when viewed from the direction of the longer side surface 130, and a straight section (a second outer main cutting edge) 163 that connects between the first and second concave sections 161 and 162. Thus, the edge strength of the longer cutting edge 160 can be enhanced through the first and second concave sections 161 and 162, and the cutting load of the longer cutting edge 160 can be reduced through the first and second concave sections 161 and 162, which results in reduces the cutting resistance with the workpiece during a pocket cutting for processing grooves and so on. Further, although not shown, when the cutting insert 100 according to the present disclosure is mounted on a cutting tool (see 200 in FIG. 6), since the cutting insert 100 according to the present disclosure may be realized in a positively inclined form with respect to the axis (see C1 in FIG. 6) of the cutting tool (see 200 in FIG. 6) through the first or second concave section 161 or 162, it is possible to prevent the interferences with the side wall of the workpiece during the step cutting and also reduce the cutting resistance when the cutting insert contacts with the workpiece.

Further, as shown in FIGS. 1 and 4, each of the first and second concave sections 161 and 162 may start from the corner cutting edge 170 and end in the straight line section 163, when viewed from the direction of the longer side surface 130. In addition, as shown in FIG. 4, the longer cutting edge 160 may have a vertically symmetrical shape with respect to the center of the straight line section such that the cutting insert can be used for both left-handed type cutting tool (not shown) and right-handed type cutting tool 200 (see FIG. 6).

Figure 7:
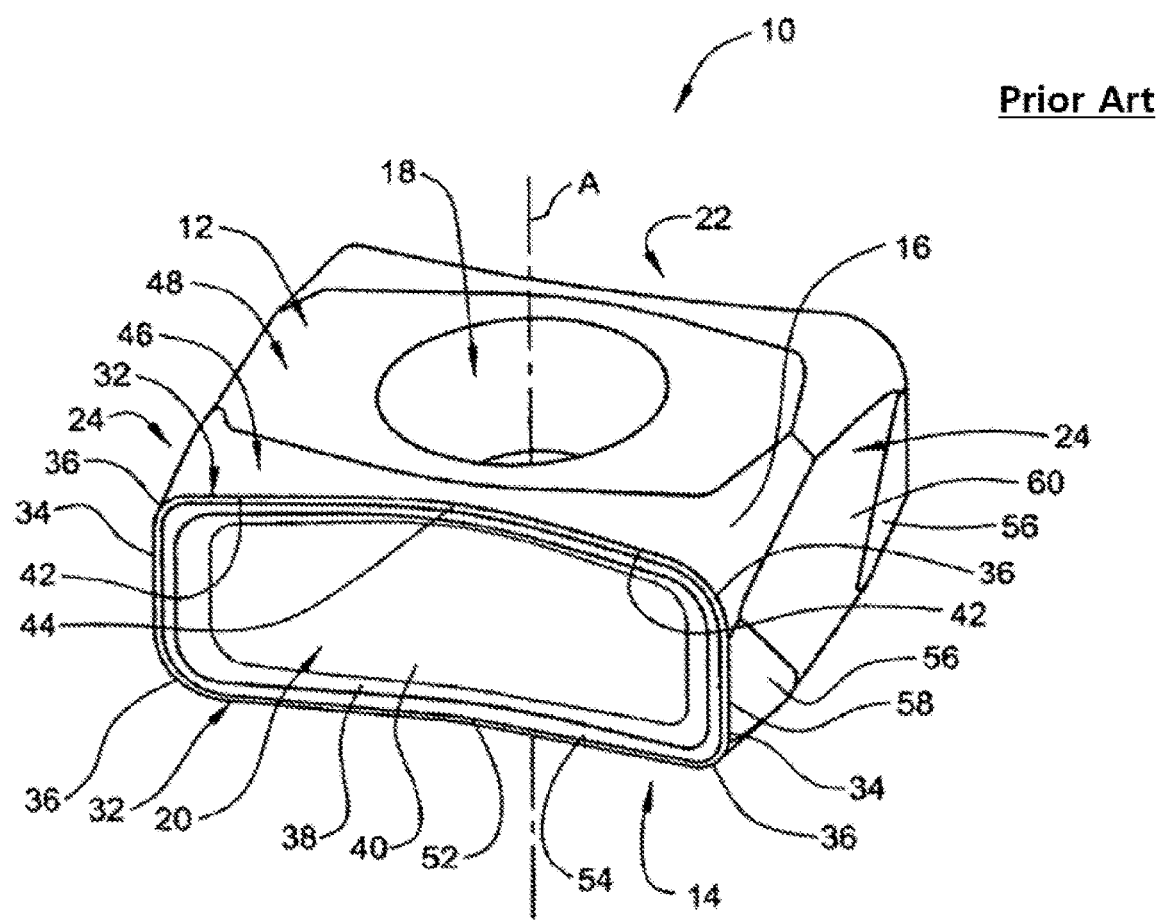
FIG. 7 is a perspective view showing a conventional tangential cutting insert.
Figure 8:
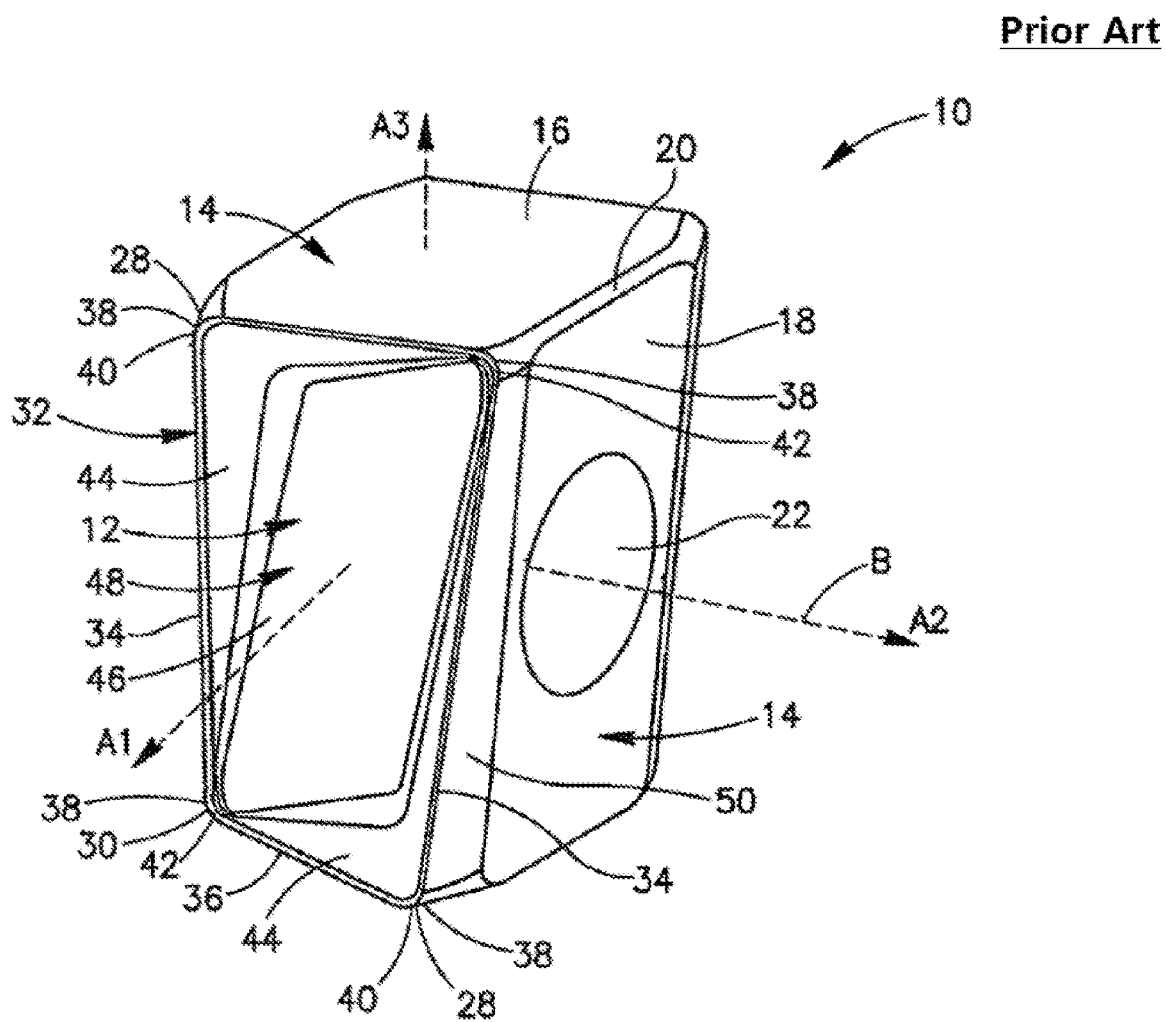
FIG. 8 is a perspective view showing another conventional double-sided cutting insert.

In addition, the straight section 163 may relatively outwardly protrude with respect to the first and second concave sections 161 and 162, as shown in FIGS. 1 and 4. Accordingly, since the longer side surface 130 becomes wider as much as the protruded straight line section 163, when the cutting insert is fastened with the cutting tool 200 (see FIG. 6), the contact area with the third seat surface 203 (see FIG. 6) of the cutting tool 200 (see FIG. 6) is increased, thus enhancing the fastening stability with respect to the cutting tool 200 (see FIG. 6). In particular, as shown in FIGS. 1 and 4, the straight section 163 of the cutting insert 100 according to the present disclosure outwardly protrudes relative to the first and second concave sections 161 and 162 so that the contact area is increased as much as the protruded section, thus resulting in enhanced fastening stability with respect to the cutting tool (200 in FIG. 6). However, according to the conventional technology, as shown in FIG. 7, the main cutting edge 32 of the cutting insert 10 is concaved in an approximately "V" shape when viewed from the direction of the upper surface 12 such that the contact area is reduced as much as the amount of the concaved depth and therefore, the fastening stability with respect to the cutting tool is deteriorated in comparison with the present disclosure.

Hereinafter, referring to FIGS. 1 to 4 again, the corner cutting edge 170 will be described in more detail.

As shown in FIGS. 1 and 4, when viewed from the direction of the long portion side surface 130, the corner cutting edge 170 may be connected to the shorter cutting edge 150 in a concave shape, continuously from the concave sections 161 and 162 of the longer cutting edge 160. Thus, the edge strength of the corner cutting edge 170 can be enhanced through the corner cutting edge 170 in the concave shape, and the cutting load of the corner cutting edge 170 can be reduced through the corner cutting edge 170 of the concave shape, which results in reduced cutting resistance with respect to the workpiece during pocket cutting for cutting grooves and so on.

Particularly, as shown in FIG. 4, the corner cutting edge 170 may be curved with the same radius of curvature as the concave sections 161 and 162 of the longer cutting edge 160 described above. Therefore, dimension management for the corner cutting edge 170 can be facilitated.

Hereinafter, referring to FIGS. 1, 3 and 5 again, the shorter side surface 120 will be described in more detail.

As shown in FIGS. 1, 3 and 5, the shorter side surface (main side surface) 120 may include first and second edge clearance surfaces 121 and 122 (primary clearance surface) adjacent to the respective major surfaces 110, and a center clearance surface (secondary clearance surface) 123 that connects the first and second edge clearance surfaces 121 and 122. In addition, as shown in FIG. 5, each of the first and second edge clearance surfaces 121 and 122 may form an obtuse angle θ1 with respect to the main surface 110. Thus, since the first and second edge clearance surfaces 121 and 122 adjacent to the shorter cutting edge 150 form an obtuse angle θ1 with respect to the main surface 110, an amount of the body of the shorter cutting edge 150 is increased, thereby increasing the strength of the shorter cutting edge 150.

Further, the center clearance surface 123 may form the right angles with respect to the main surface 110 and have a generally planar shape. Accordingly, when the cutting insert is fastened to the cutting tool 200 (see FIG. 6), the contact area with the third seat surface 203 (see FIG. 6) of the cutting tool 200 (see FIG. 6) is increased, thereby enhancing the fastening stability with respect to the cutting tool 200 (see FIG. 6).

In addition, each of the first and second edge clearance surfaces 121 and 122 may have a shape that gradually increases in width from the center thereof toward each of the longer side surface 130, as shown in FIG. 3.

Hereinafter, a cutting tool 200 according to an embodiment of the present disclosure will be described in detail with reference to FIG. 6.

FIG. 6 is a perspective view schematically showing a cutting tool equipped with the double-sided cutting insert having a high feed rate of FIG. 1.

The cutting tool 200 according to an embodiment of the present disclosure is a type of cutting tool that is equipped with a double-sided cutting insert 100 having a high feed rate according to an embodiment of the present disclosure described above, and it includes a first seat surface 201, a second seat surface 202, and a third seat surface 203, which are provided in the pocket portion.

The first seat surface 201 is where the main surface 110 of the double-sided cutting insert 100 having a high feed rate according to the present disclosure described above is placed, the second seat surface 202 is where the shorter side surface 120 of the double-sided cutting insert 100 having a high feed rate according to the present disclosure described above is placed, and the third seat surface 203 is where the longer side surface 130 of the double-sided cutting insert 100 having a high feed rate according to the present disclosure described above is placed.

In particular, the third seat surface 203 may be inclined at a second angle θ2 in a direction away from the center C1 of the cutting tool 200 toward the bottom surface 204 of the cutting tool 200. Therefore, when a double-sided cutting insert 100 having a high feed rate according to an embodiment of the present disclosure is mounted on the third seat surface of the cutting tool of the present disclosure, a back taper is formed as much as the second angle θ2, thereby reducing the interference with the workpiece during the pocket cutting.

The present disclosure has been described in detail, however, it should be understood that the detailed description and specific examples, while indicating preferred embodiments of the disclosure, are given by way of illustration only, since various changes and modifications within the scope of the disclosure will become apparent to those skilled in the art from this detailed description.

Industrial Applicability

The present disclosure relates to a double-sided cutting insert having a high feed rate and a cutting tool that is equipped with the same, which can be applied to cutting a workpiece and thus is industrially applicable.

What is claimed is:

1. A double-sided cutting insert having a high feed rate, comprising:
    two main surfaces that face in opposite directions;
    two shorter side surfaces which connect between the two main surfaces and which face in opposite directions;
    two longer side surfaces, which connect between the two main surfaces and between the two shorter side surfaces, which face in opposite directions, and a width of which is larger than a width of the shorter side surfaces; and
    a fastening hole that extends through the two longer side surfaces such that a cutting tool fastening bolt is inserted therein,
    wherein the double-sided cutting insert having a high feed rate comprises:
    a shorter cutting edge provided on a boundary portion between each of the main surfaces and each of the shorter side surfaces,
    a longer cutting edge provided on a boundary portion between each of the main surfaces and each of the longer side surfaces, and
    a corner cutting edge that connects between the shorter cutting edge and the longer cutting edge,
    wherein the shorter cutting edge comprises a curved shape that is outwardly convex, when viewed from a direction of the main surfaces; and
    wherein the shorter side surfaces comprise:
    first and second edge clearance surfaces adjacent to each of the main surfaces; and
    a center clearance surface that connects the first and second edge clearance surfaces,
    wherein each of the first and second edge clearance surfaces forms an obtuse angle with respect to the main surfaces.

2. The double-sided cutting insert of claim 1, wherein the shorter cutting edge has a curved shape that is outwardly convex, when viewed from a direction of the shorter side surfaces.

3. The double-sided cutting insert of claim 1, the longer cutting edge comprises, when viewed from a direction of the longer side surfaces,
    first and second concave sections that are inwardly concaved, and
    a straight line section that connects the first and second concave sections.

4. The double-sided cutting insert of claim 3, wherein each of the first and second concave sections starts from the corner cutting edge and ends at the straight line section, when viewed from the direction of the longer side surfaces.

5. The double-sided cutting insert of claim 4, wherein, when viewed from the direction of the longer side surfaces, the corner cutting edge is connected to the shorter cutting edge in a concave shape, continuously from the first and second concave sections.

6. The double-sided cutting insert of claim 5, wherein the corner cutting edge is curved with a same radius of curvature as the first and second concave sections.

7. The double-sided cutting insert of claim 4, wherein the longer cutting edge has a symmetrical shape with respect to a center of the straight line section.

8. The double-sided cutting insert of claim 4, wherein the straight line section protrudes outwardly relative to the first and second concave sections.

9. The double-sided cutting insert of claim 1, wherein the center clearance surface forms a right angle with respect to the main surfaces and comprises a generally planar shape.

10. The double-sided cutting insert of claim 9, each of the first and second edge clearance surfaces comprises a shape gradually increasing in width from a center toward each of the longer side surfaces.

11. The double-sided cutting insert of claim 1,
wherein each of the main surfaces is horizontally symmetrical, vertically symmetrical, and rotationally symmetrical by 180 degrees with respect to a center thereof,
wherein each of the shorter side surfaces is horizontally symmetrical, vertically symmetrical, and rotationally symmetrical by 180 degrees with respect to a center thereof, and
wherein each of the longer side surfaces is horizontally symmetrical, vertically symmetrical, and rotationally symmetrical by 180 degrees with respect to a center thereof.

12. The double-sided cutting insert of claim 1, wherein, when viewed from the direction of the main surfaces, a center of the shorter cutting edge protrudes more than another portion.

13. The double-sided cutting insert of claim 2, wherein, when viewed from a direction of the shorter side surface, a center of the shorter cutting edge protrudes more than another portion.

14. A cutting tool equipped with the double-sided cutting insert of claim 1, the cutting tool comprising:
a first seat surface on which a main surface of the main surfaces is placed;
a second seat surface on which the shorter side surface is placed; and
a third sheet seat surface on which the longer side surface is placed,
wherein the third seat surface is inclined in a direction away from a center of the cutting tool toward a bottom surface of the cutting tool.

15. A cutting tool equipped with the double-sided cutting insert of claim 2, the cutting tool comprising:
a first seat surface on which a main surface of the main surfaces is placed;
a second seat surface on which the shorter side surface is placed; and
a third seat surface on which the longer side surface is placed,
wherein the third seat surface is inclined in a direction away from a center of the cutting tool toward a bottom surface of the cutting tool.

16. A cutting tool equipped with the double-sided cutting insert of claim 3, the cutting tool comprising:
a first seat surface on which a main surface of the main surfaces is placed;
a second seat surface on which the shorter side surface is placed; and
a third seat surface on which the longer side surface is placed,
wherein the third seat surface is inclined in a direction away from a center of the cutting tool toward a bottom surface of the cutting tool.

17. A cutting tool equipped with the double-sided cutting insert of claim 11, the cutting tool comprising:
a first seat surface on which a main surface of the main surfaces is placed;
a second seat surface on which the shorter side surface is placed; and
a third seat surface on which the longer side surface is placed,
wherein the third seat surface is inclined in a direction away from a center of the cutting tool toward a bottom surface of the cutting tool.

18. A cutting tool equipped with the double-sided cutting insert of claim 12, the cutting tool comprising:
a first seat surface on which a main surface of the main surfaces is placed;
a second seat surface on which the shorter side surface is placed; and
a third seat surface on which the longer side surface is placed,
wherein the third seat surface is inclined in a direction away from a center of the cutting tool toward a bottom surface of the cutting tool.

\* \* \* \* \*